United States Patent
Siao

(10) Patent No.: US 8,963,623 B2
(45) Date of Patent: Feb. 24, 2015

(54) LOW VOLTAGE AND HIGH DRIVING CHARGE PUMP

(75) Inventor: Yuan-Long Siao, Kaohsiung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 68 days.

(21) Appl. No.: 13/482,063

(22) Filed: May 29, 2012

(65) Prior Publication Data

US 2013/0222050 A1 Aug. 29, 2013

Related U.S. Application Data

(60) Provisional application No. 61/604,649, filed on Feb. 29, 2012.

(51) Int. Cl.
*G05F 1/10* (2006.01)

(52) U.S. Cl.
USPC .......................................... 327/536

(58) Field of Classification Search
CPC ................................................ H02M 2003/076
USPC .................. 327/536, 534, 537, 530, 538, 543
See application file for complete search history.

(56) References Cited

U.S. PATENT DOCUMENTS

| | | | |
|---|---|---|---|
| 6,195,307 B1* | 2/2001 | Umezawa et al. | 365/226 |
| 2003/0151449 A1* | 8/2003 | Nakagawa et al. | 327/536 |
| 2003/0155963 A1* | 8/2003 | Huang | 327/536 |
| 2006/0119419 A1* | 6/2006 | Park et al. | 327/536 |
| 2006/0186947 A1* | 8/2006 | Lin et al. | 327/536 |
| 2007/0146054 A1* | 6/2007 | Yamahira et al. | 327/536 |
| 2008/0169864 A1* | 7/2008 | Yamahira | 327/536 |
| 2010/0219881 A1* | 9/2010 | Chen et al. | 327/536 |

* cited by examiner

*Primary Examiner* — Jung Kim
(74) *Attorney, Agent, or Firm* — Eschweiler & Associates, LLC

(57) ABSTRACT

The present disclosure relates to a charge pump circuit having one or more voltage multiplier circuits that enable generation of an output signal having a higher output voltage. In one embodiment, the charge pump circuit comprises a NMOS transistor having a drain connected to a supply voltage and a source connected to a chain of diode connected NMOS transistors coupled in series. A first voltage multiplier circuit is configured to generate a first two-phase output signal having a maximum voltage value that is twice the supply voltage. The first two-phase output signal is applied to the gate of the NMOS transistor, forming a conductive channel between the drain and the source, thereby allowing the supply voltage to pass through the NMOS transistor without a threshold voltage drop. Therefore, degradation of the charge pump output voltage due to voltage drops of the NMOS transistor is reduced, resulting in larger output voltages.

18 Claims, 3 Drawing Sheets

# LOW VOLTAGE AND HIGH DRIVING CHARGE PUMP

BACKGROUND

Charge pumps circuits are circuits that generate an output voltage larger than the voltage from which they operate. Charge pump circuits typically comprise a diode chain having a plurality of diode devices connected in series, with capacitors connected between adjacent diode devices. The capacitors are further connected to one or more clock signals that periodically change the voltage potential across the capacitors. The periodic changes to the voltage potential drive charge along the series of diode devices to generate an output signal having a relatively large voltage value.

Charge pump circuits are widely used in modern integrated chips (ICs) due to the continued reduction of on-chip supply voltages. Charge pumps can convert a relatively low on-chip supply voltage to a higher voltage that may be used by a variety of IC components. For example, charge pumps may be used to generate a relatively high voltage used in EEPROM or flash memory programming circuits or in a number of low-voltage/low power analog integrated circuit applications.

DETAILED DESCRIPTION

Figure 1:
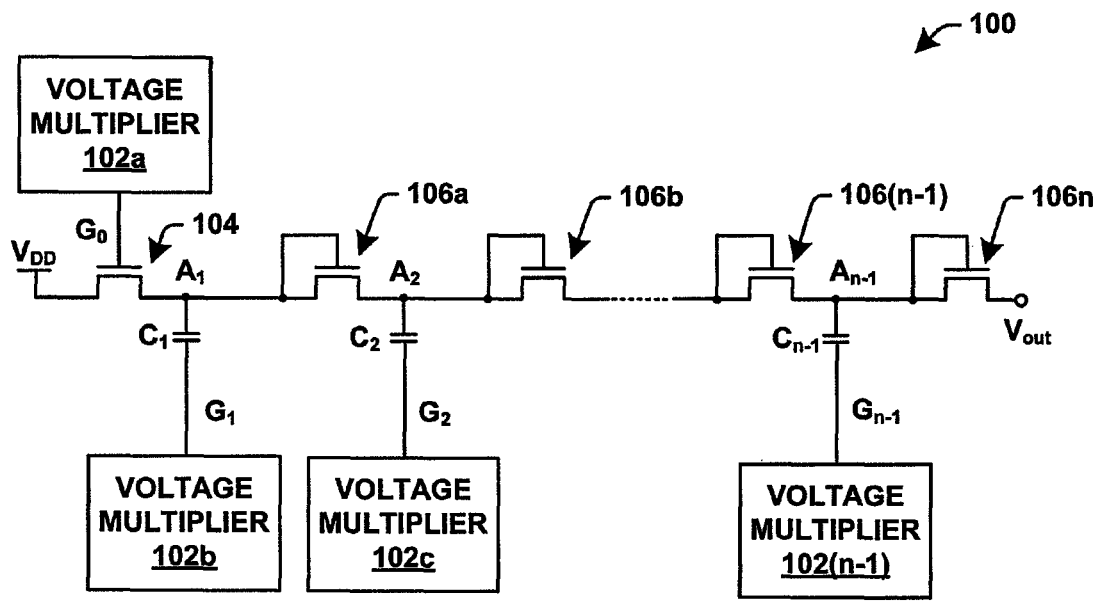
FIG. 1 illustrates a block diagram of some embodiments of a charge pump circuit.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

FIG. 1 illustrates some embodiments of a charge pump circuit 100 as provided herein. The charge pump circuit 100 comprises a plurality of voltage multiplier circuits 102x that are configured to increase the voltage of the output signal $V_{out}$ of the charge pump circuit 100.

As illustrated in FIG. 1, the charge pump circuit 100 comprises a first NMOS transistor 104 having a drain connected to a supply voltage $V_{DD}$, a source connected to a first electrode of a first capacitor $C_1$, and a gate (i.e., a control terminal) connected to a first voltage multiplier circuit 102a. The first voltage multiplier circuit 102a is configured to generate a first two-phase output signal at $G_0$. During a first clock phase, the first two-phase output signal has a maximum voltage value greater than the supply voltage $V_{DD}$ (e.g., $2 \cdot V_{DD}$). During a second subsequent clock phase, the first two-phase output signal has a voltage value of substantially 0 V. The first two-phase output signal is provided to the gate of NMOS transistor 104, so that the first voltage multiplier circuit 102a controls operation of the gate of NMOS transistor 104.

The first two-phase output signal is configured to increase the value of the voltage that is applied to the gate of the NMOS transistor 104 to a voltage value that drives the NMOS transistor 104 to form a conductive channel extending between the source and the drain of the NMOS transistor. The conductive channel allows the entire supply voltage $V_{DD}$ to be passed through NMOS transistor 104. For example, if the first voltage multiplier circuit 102a generates a first two-phase output signal that drives $G_0$ to a voltage value that is twice the supply voltage (i.e., $2 \cdot V_{DD}$), a conductive channel is formed between the drain and the source of NMOS transistor 104 so that the NMOS transistor 104 can fully pass the supply voltage $V_{DD}$ without a threshold voltage drop (i.e., the voltage potential at node $A_1$ becomes $V_{DD}$ even under low $V_{DD}$ operation). This is in contrast to typical charge pump circuits, which during low $V_{DD}$ operation drive $G_0$ to $V_{DD}$, resulting in a voltage value of $V_{DD}-V_{th}$ at node $A_1$, where $V_{th}$ is the threshold voltage.

The remaining voltage multiplier circuits 102b-102(n-1) are connected between downstream diode devices, illustrated in FIG. 1 as diode connected NMOS transistors, and are configured to further increase the voltage value of the output signal $V_{out}$ by increasing the charge output by each capacitor $C_1$-$C_{n-1}$ during pumping. For example, referring again to FIG. 1, a first diode connected NMOS transistor 106a comprises a drain and gate connected to the source of NMOS transistor 104 and to a first electrode of a capacitor $C_1$, and a source connected to a first electrode of a downstream capacitor $C_2$. A second voltage multiplier circuit 102b is configured to generate a second two-phase output signal with a maximum voltage value (e.g., during a first or second clock phase) larger than the supply voltage, which controls the voltage potential across the first capacitor $C_1$. In one embodiment, the second two-phase output signal has a voltage value that is substantially equal to zero in a first clock phase and a voltage value that is twice the supply voltage (e.g., $2 \cdot V_{DD}$) in a second clock phase. Therefore, because the second voltage multiplier circuit 102b generates a second two-phase output signal with a maximum voltage larger than the supply voltage, the charge driven from capacitor $C_1$ during each discharge phase is increased over typical charge pumps.

Subsequent downstream diode devices are connected to an associated voltage multiplier circuit configured to generate a two-phase output signal that increases the charge output by the associated capacitor during pumping, in a manner similar to that described above. For example, as shown in FIG. 1, subsequent downstream diode connected NMOS transistors (e.g., 106b) have a drain and gate connected to the source of a prior diode connected NMOS transistor (e.g., 106a) and a first electrode of an associated capacitor (e.g., $C_2$), and a source connected to a first electrode of an downstream capacitor. Such diode connected NMOS transistors are connected to an associated voltage multiplier circuit (e.g., 102c), which is configured to generate a two-phase output signal that increases the charge output by the associated capacitor (e.g., $C_2$) during pumping, in a manner similar to that described above.

It will be appreciated that although the downstream diode devices of FIG. 1 are illustrated as diode connected NMOS transistors 106a-106b that the downstream diode devices are not limited thereto. Rather the downstream diode device may comprise any electronic component configured to allow an electric current to pass in one direction, while blocking current in the opposite direction.

Figure 2A:
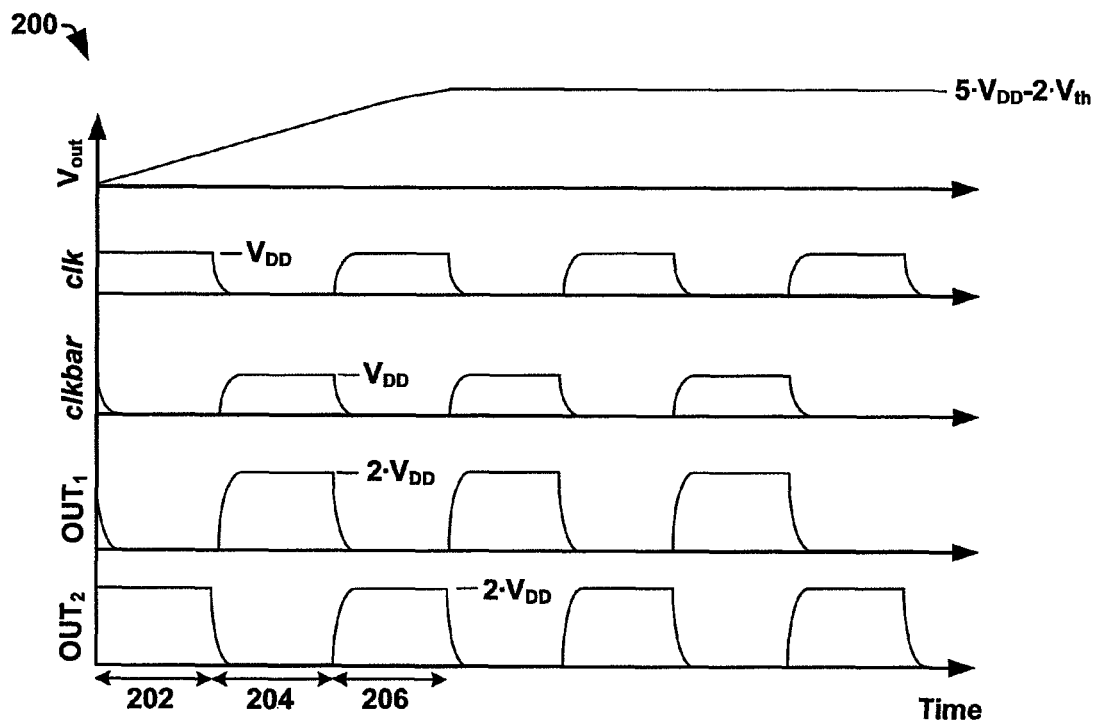
FIG. 2A illustrates exemplary timing diagrams of an operation of an exemplary charge pump circuit.
Figure 2B:
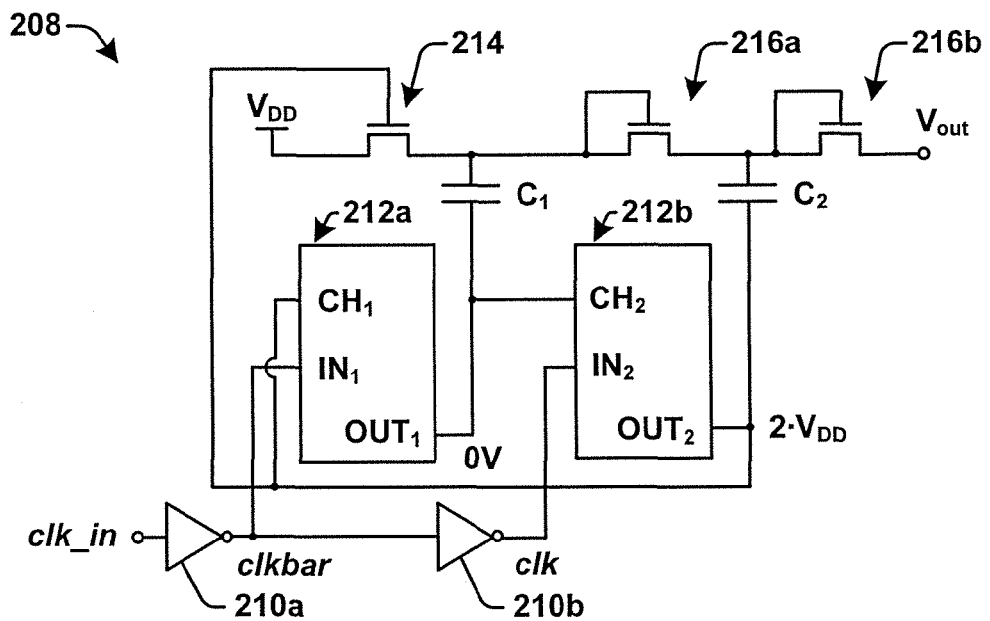
FIG. 2B illustrates a block diagram of some embodiments of the exemplary charge pump circuit.

FIG. 2A-2B illustrate some embodiments of an exemplary two stage charge pump circuit and an operation of the exemplary charge pump circuit. FIG. 2A illustrates timing diagrams 200 of an exemplary operation of the two stage charge pump circuit. FIG. 2B illustrate a block diagram of the exemplary two stage charge pump circuit, showing voltage values associated with the timing diagrams of FIG. 2A. It will be appreciated that the clock signals illustrated in FIG. 2A are non-limiting examples of clock signals, which are intended to aid the reader in understanding the disclosed method and apparatus. In alternative embodiments, the clock signals clk and clkbar, which are illustrated in FIG. 2A as substantially square waves with a maximum value of $V_{DD}$, may comprise different waveforms and/or have a different maximum value.

As illustrated in FIG. 2B, the exemplary two stage charge pump circuit 208 comprises an NMOS transistor 214 coupled to a plurality of diode connected NMOS transistors (216a and 216b) connected in series. A first electrode of a first capacitor $C_1$ is coupled between the NMOS transistor 214 and an adjacent diode connected NMOS transistor 216a. A second electrode of the first capacitor $C_1$ is directly coupled to a first voltage doubler circuit 212a. Similarly, a first electrode of a second capacitor $C_2$ is coupled between diode connected NMOS transistor 216a and an adjacent diode connected NMOS transistor 216b. A second electrode of the second capacitor $C_2$ is coupled to a second voltage doubler circuit 212b.

Respective voltage doubler circuits (e.g., voltage doubler circuits 212a, 212b) have a first input $IN_x$, a second input $CH_x$, and an output $OUT_x$. The first input $IN_x$ is coupled to the output of an inverter (e.g., $IN_1$ is coupled to the output of inverter 210a, $IN_2$ is coupled to the output of inverter 210b), which is configured to provide a clock signal (e.g., clkbar, clk) to the voltage doubler circuit. The second input $CH_x$ of a voltage doubler circuit is coupled to the output of another voltage doubler circuit that generates an output signal that is complementary to the output of the voltage doubler circuit (e.g., the first voltage doubler circuit has a second input $CH_1$ coupled to an output of the second voltage doubler circuit, the second voltage doubler circuit has a second input $CH_2$ coupled to an output of the first voltage doubler circuit). Respective voltage doubler circuits are configured to generate a two-phase output signal by increasing the voltage potential of the clock signal received at the first input $IN_x$. The two-phase output signal is provided at the output $OUT_x$, which coupled to second electrode of an associated capacitor $C_x$.

Referring to FIG. 2A, during operation of the exemplary two stage charge pump circuit 208, complementary input clock signals clk and clkbar drive the first and second voltage doubler circuits 212a and 212b to generate complementary two-phase output signals.

The first voltage doubler circuit 212a operates based upon an input clock signal clkbar, which is an inverted version of the input clock signal clk_in, to control the voltage potential across the capacitor $C_1$ based upon the voltage difference between phases of a first two-phase output signal provided at $OUT_1$. For example, during a first clock phase 202, the first inverter 210a outputs an input clock signal clkbar having a voltage value of 0 V to the first voltage doubler circuit 212a. The resulting first two-phase output signal provided at $OUT_1$ is at 0 V and the second two-phase output signal provided at $OUT_2$ is at $2 \cdot V_{DD}$. The second two-phase output signal fully turns on NMOS transistor 214, causing the entire supply voltage $V_{DD}$ to be supplied to the top electrode of capacitor $C_1$.

During a second clock phase 204, the first inverter 210a outputs an input clock signal clkbar having a voltage value of $V_{DD}$ to the first voltage doubler circuit 212a. The resulting first two-phase output signal provided at $OUT_1$ is approximately $2 \cdot V_{DD}$ and the second two-phase output signal provided at $OUT_2$ is at 0 V. The second two-phase output signal fully turns off NMOS transistor 214. The change in the first two-phase output signal provided at $OUT_1$ raises the voltage potential at the lower electrode of capacitor $C_1$, changing the voltage potential difference between the electrodes of capacitor $C_1$. The rising voltage potential at the bottom capacitor electrode is approximately $2 \cdot V_{DD}$. Thus, the voltage potential at the top electrode of capacitor $C_1$ will become approximately $3 \cdot VDD$, ideally. Since NMOS transistor 214 is turned off, the charge from capacitor $C_1$ (approximately $3 \cdot V_{DD}$) is driven through diode connected NMOS transistor 216a, causing the voltage potential at the top electrode of capacitor $C_2$ to be at approximately $3 \cdot V_{DD} - V_{th}$, where $V_{th}$ is the threshold voltage of diode connected NMOS transistor 216a.

Therefore, since the first two-phase output signal provides for an increased voltage potential difference across capacitor $C_1$, the first voltage doubler circuit 212a increases the charge that is output from capacitor $C_1$ to a downstream diode connected NMOS transistor (e.g., 216b) during each discharge phase.

The second voltage doubler circuit 212b operates based upon an input clock signal clk that is an inverted version of the input clock signal clkbar, to control the voltage potential across the capacitor $C_2$ based upon the voltage difference between phases of the two-phase output signal provided at $OUT_2$. For example, during a second clock phase 204, the second inverter 210b outputs an input clock signal clk having a voltage of 0 V to the second voltage doubler circuit 212b. When the input clock signal clk is at 0 V, the second two-phase output signal provided at $OUT_2$ is 0 V. During the second clock phase 204, the top electrode of capacitor $C_2$ has a voltage potential of approximately $3 \cdot V_{DD} - V_{th}$ and the voltage at the bottom electrode of capacitor $C_2$ is at 0 V.

During a third clock phase 206, the second inverter 210b outputs an input clock signal clk having a voltage value of $V_{DD}$ to the second voltage doubler circuit 212b. When clock signal clk is at $V_{DD}$ the second two-phase output signal provided at $OUT_2$ is approximately $2 \cdot V_{DD}$. Thus, the voltage potential at the top capacitor will become approximately $5 \cdot VDD - V_{th}$ ideally. Since the diode connected NMOS transistor 216a blocks the charge driven off of capacitor $C_2$, is passed through diode connected NMOS transistor 216b to provide a voltage potential at the output node $V_{out}$ of $5 \cdot V_{DD} - 2 \cdot V_{th}$ ideally.

Therefore, since the second two-phase output signal provides for an increased voltage potential difference across the capacitor $C_2$, it increases the charge that is output from the capacitor $C_2$ to a downstream diode connected NMOS transistor (e.g., 216c) during each discharge phase.

As shown in FIG. 2A, the output voltage $V_{out}$ of the charge pump circuit 208 will continue to increase over time as the charges output from respective charge pump stages are provided at the output $V_{out}$ of the charge pump circuit.

One of ordinary skill in the art will appreciate that although FIG. 2A-2B illustrate the operation of a two stage charge pump circuit, the ideas disclosed herein may be applied to charge pump circuits having any number stages. In alternative embodiments, an increased number (e.g., more than two) of charge pump stages may be used to increase the overall output voltage since each charge pump stage provides for an increase in the charge of the output voltage.

Figure 3:
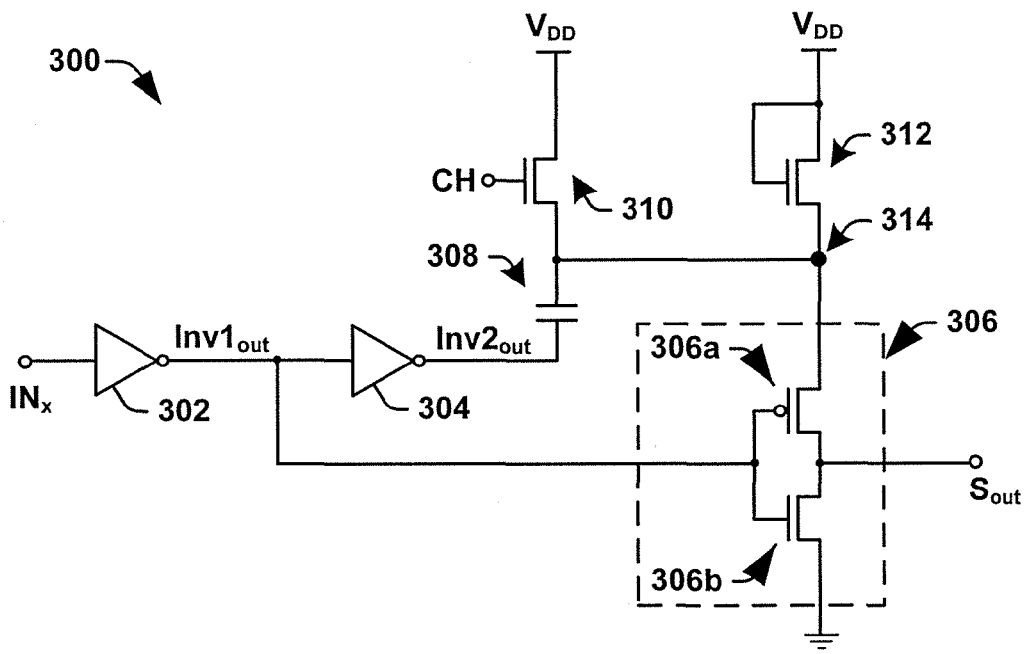
FIG. 3 illustrates a block diagram of some embodiments of an exemplary embodiment of a voltage doubler circuit, as provided herein.

FIG. 3 illustrates some embodiments of a voltage multiplier circuit (e.g., corresponding to voltage multiplier circuit 102a, 102b, etc.) comprising a voltage doubler circuit 300.

As illustrated in FIG. 3, the voltage doubler circuit 300 comprises an input terminal $IN_x$ (e.g., correspond to input $IN_1$ of voltage doubler 212a or input $IN_2$ of voltage doubler 212b) coupled to a first inverter 302. The output of the first inverter 302 is coupled to a second inverter 304 and to a CMOS inverter 306.

The CMOS inverter circuit 306 comprises a PMOS transistor 306a and an NMOS transistor 306b. The drains of the NMOS and PMOS transistors are coupled to an output terminal $S_{out}$ of the voltage doubler circuit 300. The source of the NMOS transistor is coupled to a ground terminal and the source of the PMOS transistor is coupled to node 314. The gates of the NMOS and PMOS transistors are coupled to the output of the first inverter 302. Since the NMOS transistor 306b is turned on (and the PMOS transistor 306a is turned off) when the gate voltage is high, the CMOS inverter 306 will connect the output terminal $S_{out}$ to the ground terminal when the output of the first inverter 302 is high. Since the PMOS transistor 306a is turned on (and the NMOS transistor 306b is turned off) when the gate voltage is low, the CMOS inverter 306 will connect the output terminal $S_{out}$ to node 314 when the output of the first inverter 302 is low. The diode connected NMOS transistor 312 is configured to pre-charge node 314.

The second inverter 304 is configured to receive the output of the first inverter 302 and to generate an inverted value that is provided to a first electrode of a capacitor 308. The second electrode of the capacitor 308 is coupled to the drain of NMOS transistor 310. Because the gate of NMOS transistor 310 is controlled by the two-phase output signals (e.g., provided at output $OUT_x$) of a voltage multiplier circuit, the gate of NMOS transistor 310 can reach $2 \cdot V_{DD}$ causing node 314 can be charged up to $V_{DD}$, when the output of the second inverter 304 is low and CH is $2 \cdot V_{DD}$, node 314 will be charged up to VDD. When the output of the second inverter 304 goes high and CH goes low, node 314 will be charged up to $2 \cdot VDD$. At the same time, $S_{out}$ will be charged up to $2 \cdot VDD$ as well.

Figure 4:
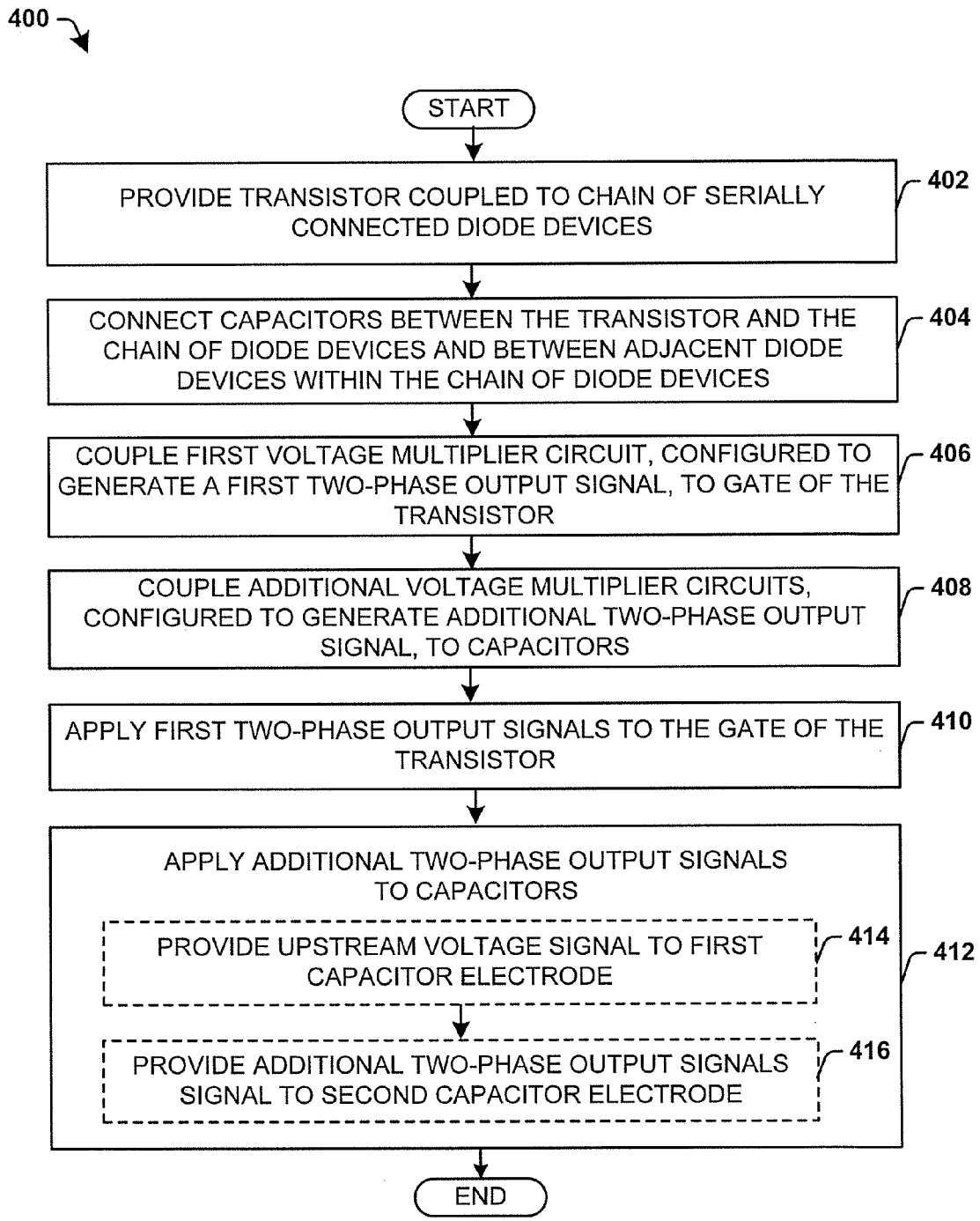
FIG. 4 is a flow diagram illustrating some embodiments of an exemplary methodology for forming and operating a charge pump circuit as provided herein.

FIG. 4 illustrates a flow diagram of some embodiments of an exemplary method 400 of forming and operating a charge pump circuit. While method 400 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 402 a transistor coupled to a chain of serially connected diode devices is provided. In some embodiments, the transistor comprises an NMOS transistor, coupled to a chain of serially connected diode connected NMOS transistors. In particular, a drain of the NMOS transistor is connected to a voltage source configured to provide a supply voltage while a source of a NMOS transistor is connected to a drain of a first diode connected NMOS device, which is connected to subsequent diode connected NMOS transistors.

At 404 capacitors are connected between the transistor and the chain of diode device and between adjacent diode devices within the chain. In some embodiments, a first capacitor is connected between the NMOS transistor and an adjacent first diode connected NMOS device, such that a first electrode of the first capacitor is electrically connected to the diode chain. One or more additional capacitors are connected between adjacent serially coupled diode connected NMOS transistors.

At 406 a first voltage multiplier circuit is connected to a gate of the transistor. The first voltage multiplier circuit (e.g., voltage doubler circuit) is configured to generate a first two-phase having a greater maximum value than the supply voltage of the charge pump circuit (e.g., $2 \cdot V_{DD}$) during a first clock phase and a voltage value of substantially 0 V during a second clock phase.

At 408 additional voltage multiplier circuits are connected to the capacitors. The additional voltage multiplier circuits (e.g., voltage doubler circuits) are configured to generate additional two-phase output signals having a greater maximum value than the supply voltage of the charge pump circuit (e.g., $2 \cdot V_{DD}$) during a first clock phase and a voltage value of substantially 0 V during a second clock phase. In one embodiment, a first electrode of a capacitor is connected to the source and drain of adjacent transistors (e.g., between the NMOS transistor and an adjacent first diode connected NMOS transistor or between adjacent diode connected NMOS transistors), while a second electrode of the capacitor is connected to an additional voltage multiplier circuit. In one embodiment, the first voltage multiplier circuit and one of the additional voltage multiplier circuits may comprise a same voltage multiplier circuit. In another embodiment, the first voltage multiplier circuit and one of the additional voltage multiplier circuits may comprise different voltage multiplier circuits.

At 410 the first two-phase output signal is applied to the gate of the transistor to control the gate voltage of the transistor. The maximum value of the first two-phase output signal causes a continuous channel to form between the drain and source of the NMOS transistor, such that the supply voltage is fully passed through the NMOS transistor (e.g., without a voltage drop) even at low supply voltage operation.

At 412 additional two-phase output signals are applied to the capacitors. The additional two-phase output signals increase the charge discharged by each capacitor in a discharge phase of the charge pump. In one embodiment, an upstream voltage signal is provided to a first capacitor electrode (414) and an additional two-phase output signal, complementary to the upstream voltage signal, is applied to a second capacitor electrode (416). Since the additional two-phase output signal and upstream voltage signal are complementary, a voltage potential difference is generated across the capacitor causing charges to accumulate on and discharge from the capacitor. Furthermore, since the two-phase output signal has a voltage that is greater than the supply voltage, the charges driven from a capacitor are greater than that provided by prior art charge pumps.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated as utilizing diode connected NMOS MOSFET transistors within the charge pump, other device types (e.g., PMOS devices) or other devices (e.g., BJT's) may also be used. Additionally, the ideas disclosed herein may be applied to charge pump circuits having any number stages. In alternative embodiments, wherein an increased number (e.g., more than two) of charge pump stages are used complementary operation is enabled by providing the output of a complementary voltage multiplier circuit output as a second input to a voltage multiplier circuit In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Therefore, the present disclosure relates to a charge pump circuit having one or more voltage multiplier circuits that enable generation of an output signal having a higher output voltage.

In one embodiment, the present disclosure relates to a charge pump circuit. The charge pump circuit has a plurality of diode devices coupled in series, such that a first diode device is coupled to a second diode device. A transistor, having a source coupled to a voltage source configured to provide a supply voltage, and a drain coupled to the first diode device. A first voltage multiplier circuit has an output coupled to a gate of the transistor. The first voltage multiplier circuit is configured to generate a first two-phase output signal having a maximum voltage in alternating clock phases that is sufficient to form a channel extending between the source and drain of the transistor, thereby allowing the supply voltage to pass through the transistor without a voltage drop.

In another embodiment, the present disclosure relates to a charge pump circuit. The charge pump circuit has a NMOS transistor having a drain coupled a supply voltage. A first diode connected NMOS transistor has a drain coupled to a source of the NMOS transistor. A first capacitor has a first electrode coupled to the source of the NMOS transistor. A second capacitor has a first electrode coupled to the source of the first diode connected NMOS transistor. A first voltage doubler circuit has an output coupled to a second electrode of the first capacitor and is configured to generate a first two-phase output signal that changes the voltage potential at the second electrode. A second voltage doubler circuit has an output coupled to a second electrode of the second capacitor and to a gate of the NMOS transistor, and is configured to generate a second two-phase output signal that controls the gate voltage of the NMOS transistor and that changes the voltage potential at the second electrode of the second capacitor. Since the first and second two-phase output signals have maximum values greater than the supply voltage, the voltage doubler circuits increase the voltage of the output signal of the charge pump circuit In yet another embodiment, the present disclosure relates to a method for forming and operating a charge pump circuit. The method comprises providing a charge pump circuit having a first transistor having a source configured to receive a supply voltage and a drain coupled to a chain of serially connected diode devices. Capacitors are connected between the transistor and the chain of serially connected diode devices and between adjacent diode devices within the chain. A first voltage multiplier circuit is coupled to the gate of the first transistor, and is configured to generate a first two-phase output signal having a maximum voltage in alternating clock phases that is sufficient to form a channel between the source and drain of the first transistor. The first two-phase output signal is applied to the gate of the first transistor, thereby allowing the supply voltage to pass through the first transistor without a voltage drop.

What is claimed is:

1. A charge pump circuit, comprising:
a plurality of diode devices coupled in series, such that a first diode device is coupled to a second diode device;
a transistor, having a source coupled to a voltage source configured to provide a supply voltage, and a drain coupled to the first diode device;
a first voltage multiplier circuit having an output coupled to a gate of the transistor, wherein the first voltage multiplier circuit is configured to generate a first two-phase output signal having a voltage value equal to zero during a first clock phase and a voltage value equal to twice the supply voltage during a second subsequent clock phase; and
a second voltage multiplier circuit configured to generate a second two-phase output signal having a maximum value in alternating clock phases that is greater than the supply voltage, comprising a first input coupled to an output of a first inverter configured to provide a first input signal equal to an inverted version of an input clock signal and a second input coupled to an output of the first voltage multiplier circuit and configured to receive the first two-phase output signal.

2. The charge pump circuit of claim 1,
wherein the plurality of diode devices comprise a plurality of diode connected NMOS transistors coupled in series, such that a drain of a first diode connected NMOS transistor is coupled to a source of a second diode connected NMOS transistor; and
wherein the drain of the transistor is coupled to the first diode connected NMOS transistor.

3. The charge pump circuit of claim 2, further comprising:
a first capacitor having a first electrode connected between the drain of the transistor and the first diode connected NMOS transistor; and
wherein the second two-phase output signal causes charges to accumulate onto and be driven off of the first capacitor.

4. The charge pump circuit of claim 3, further comprising:
a second capacitor having a first electrode coupled between the drain of the first diode connected NMOS transistor and the source of the second diode connected NMOS transistor and a second electrode coupled to an output of the first voltage multiplier circuit;
wherein during a first clock phase of the first two-phase output signal charges accumulate on the second capacitor and wherein during a second clock phase of the first two-phase output signal the accumulated charges are driven off of the second capacitor through the second diode connected NMOS transistor.

5. The charge pump circuit of claim 3, further comprising:
a second capacitor having a first electrode coupled between the drain of the first diode connected NMOS transistor and the source of the second diode connected NMOS transistor and a second electrode coupled to an output of a third voltage multiplier circuit configured to output a third two-phase output signal;
wherein during a second clock phase of the third two-phase output signal charges accumulate on the second capacitor and wherein during a third clock phase of the third two-phase output signal the accumulated charges are driven off of the second capacitor through the second diode connected NMOS transistor.

6. The charge pump circuit of claim 1, wherein the first input signal has a voltage value equal to zero during the first clock phase and a voltage value equal to the supply voltage during the second subsequent clock phase.

7. The charge pump circuit of claim 3,
wherein the second two-phase output signal has a voltage value equal to twice the supply voltage during a first clock phase, a voltage value equal to zero during a second clock phase, and a voltage value equal to twice the supply voltage during a third clock phase, such that during the second clock phase charges accumulate on the first capacitor and during the third clock phase the accumulated charges are driven off of the first capacitor through the first diode connected NMOS transistor.

8. The charge pump circuit of claim 7, wherein the first voltage multiplier circuit comprises:
a first input coupled to an output of a second inverter, which is configured to provide a second input signal equal to the input clock signal; and
a second input that is coupled to an output of the second voltage multiplier circuit and that is configured to receive the second two-phase output signal.

9. The charge pump circuit of claim 3, wherein respective voltage multiplier circuits each comprise:
a first voltage doubler inverter configured to receive an input signal and to output an inverted input signal;
a second voltage doubler inverter configured to receive the inverted input signal and to output the input signal to a first electrode of a voltage doubler capacitor;
a voltage doubler transistor having a source coupled to a voltage doubler voltage source configured to provide the supply voltage, and a drain coupled to a second electrode of the voltage doubler capacitor, wherein during alternating phases of the input signal, charge is accumulated onto or driven off of the voltage doubler capacitor; and
a CMOS inverter configured to receive the inverted input signal and based thereupon to connect an output node of the voltage multiplier circuit to either a ground terminal or the voltage doubler capacitor.

10. The charge pump circuit of claim 9,
wherein the CMOS inverter is configured to connect the output node of the voltage multiplier circuit to the ground terminal when the input signal causes charges to accumulate on the voltage doubler capacitor; and
wherein the CMOS inverter is configured to connect the output node of the voltage multiplier circuit to the voltage doubler capacitor when the input signal causes charges to be driven off of the voltage doubler capacitor.

11. A charge pump circuit, comprising:
a NMOS transistor having a drain coupled to a supply voltage;
a first diode connected NMOS transistor having a drain coupled to a source of the NMOS transistor;
a first capacitor having a first electrode coupled to the source of the NMOS transistor;
a second capacitor having a first electrode coupled to the source of the first diode connected NMOS transistor;
a first voltage doubler circuit configured to generate a first two-phase output signal that changes a voltage potential at a second electrode of the first capacitor, comprising:
a first voltage doubler inverter configured to receive an input signal and to output an inverted input signal;
a second voltage doubler inverter configured to receive the inverted input signal and to output the input signal to a first electrode of a voltage doubler capacitor;
a voltage doubler transistor having a drain coupled to a voltage doubler voltage source configured to provide the supply voltage, and a source coupled to a second electrode of the voltage doubler capacitor; and
a CMOS inverter coupled to the first voltage doubler inverter and configured to receive the inverted input signal and based thereupon to connect an output node of the first voltage doubler circuit to either a ground terminal or the voltage doubler capacitor;
a diode connected transistor having a drain coupled to the supply voltage and a source coupled to the CMOS inverter, the source of the voltage doubler transistor, and the second electrode of the voltage doubler capacitor; and
a second voltage doubler circuit having an output coupled to a second electrode of the second capacitor and to a gate of the NMOS transistor, wherein the second voltage doubler circuit is configured to generate a second two-phase output signal that controls a voltage value at the gate of the NMOS transistor and that changes a voltage potential at the second electrode of the second capacitor.

12. The charge pump circuit of claim 11, wherein the first and second two-phase output signals are complementary, such that during a first clock phase the first two-phase output signal is low and the second two-phase output signal is high and during a second subsequent clock phase the first two-phase output signal is high and the second two-phase output signal is low.

13. The charge pump circuit of claim 12, wherein the first voltage doubler circuit, comprises:
a first input coupled to an output of a first inverter, which is configured to provide a first input signal equal to an inverted version of an input clock signal; and
a second input that is coupled to an output of the second voltage doubler circuit and that is configured to receive the second two-phase output signal.

14. The charge pump circuit of claim 13, wherein the second voltage doubler circuit comprises:
a first input coupled to an output of a second inverter, which is configured to provide a second input signal equal to the input clock signal; and
a second input that is coupled to an output of the first voltage doubler circuit and that is configured to receive the first two-phase output signal.

15. A charge pump circuit, comprising:
a plurality of diode devices coupled in series, such that a first diode device is coupled to a second diode device;
a transistor, having a source coupled to a voltage source configured to provide a supply voltage, and a drain coupled to the first diode device;
a first voltage multiplier circuit configured to generate a first two-phase output signal having a maximum voltage in alternating clock phases that is sufficient to form a channel extending between the source and drain of the transistor, comprising:
an output coupled to a gate of the transistor;
a first input coupled to an output of a second inverter, which is configured to provide a second input signal equal to an input clock signal; and
a second input; and
a second voltage multiplier circuit configured to provide a second two-phase output signal to the second input, which has a maximum value in alternating clock phases that is greater than the supply voltage.

16. The charge pump circuit of claim 15, wherein the second voltage multiplier circuit comprises:
a first input coupled to an output of a first inverter, which is configured to provide a first input signal equal to an inverted version of the input clock signal, wherein the first input signal equal to the inverted version of the input clock signal has a voltage value equal to zero a first clock phase and a voltage value equal to the supply voltage during a second subsequent clock phase; and a second input that is coupled to the output of the first voltage multiplier circuit and that is configured to receive the first two-phase output signal.

17. The charge pump circuit of claim 15, wherein respective voltage multiplier circuits each comprise:

a first voltage doubler inverter configured to receive an input signal and to output an inverted input signal;

a second voltage doubler inverter configured to receive the inverted input signal and to output the input signal to a first electrode of a voltage doubler capacitor;

a voltage doubler transistor having a source coupled to a voltage doubler voltage source configured to provide the supply voltage, and a drain coupled to a second electrode of the voltage doubler capacitor, wherein during alternating phases of the input signal, charge is accumulated onto or driven off of the voltage doubler capacitor; and a CMOS inverter configured to receive the inverted input signal and based thereupon to connect an output node of the voltage multiplier circuit to either a ground terminal or the voltage doubler capacitor.

18. The charge pump circuit of claim 15, further comprising:

a first capacitor having a first electrode connected between the drain of the transistor and the first diode device, wherein the second two-phase output signal causes charges to accumulate onto and be driven off of the first capacitor.

* * * * *